United States Patent [19]

Elter et al.

[11] 4,302,293
[45] Nov. 24, 1981

[54] GAS-COOLED HIGH TEMPERATURE REACTOR WITH SUPPORTING STRUCTURE HAVING GAS CONDUITS THEREIN

[75] Inventors: Claus Elter, Bad Durkheim; Wilfried Stracke, Oftersheim; Heinrich Stach, Ilvesheim; Josef Schoening, Hambruecken; Hans G. Schwiers, Ketsch, all of Fed. Rep. of Germany

[73] Assignee: Hochtemperatur-Reaktorbau GmbH, Cologne, Fed. Rep. of Germany

[21] Appl. No.: 85,379

[22] Filed: Oct. 16, 1979

[30] Foreign Application Priority Data

Dec. 15, 1978 [DE] Fed. Rep. of Germany ....... 2854155

[51] Int. Cl.³ ............................................. G21C 19/28
[52] U.S. Cl. ............................................. 376/381
[58] Field of Search ...................... 176/58, 58 PB, 187

[56] References Cited

U.S. PATENT DOCUMENTS

| 3,228,852 | 1/1966 | Holmes et al. | 176/58 PB |
| 3,454,080 | 7/1969 | Kunzli | 176/87 |
| 3,523,062 | 8/1970 | Brown | 176/87 |
| 3,537,420 | 11/1970 | Chollet et al. | 176/87 |
| 3,544,425 | 12/1970 | Shaw et al. | 176/87 |
| 4,189,347 | 2/1980 | Reutler | 176/58 PB |

FOREIGN PATENT DOCUMENTS

| 2742847 | 4/1979 | Fed. Rep. of Germany | 176/58 PB |
| 1458504 | 11/1966 | France | 176/58 PB |

Primary Examiner—Sal Cangialosi
Attorney, Agent, or Firm—Schwartz, Jeffery, Schwaab, Mack, Blumenthal & Koch

[57] ABSTRACT

A gas-cooled high temperature reactor is equipped with a supporting structure for the reactor core having a gas conduit passing through the support structure from a hot gas collecting space beneath the supporting structure. The supporting structure itself rests on a floor plate in a columnar arrangement. The floor plate also rests on support columns and possesses a disk-like center portion indirectly supporting the reactor core and an outer annular portion supporting a lateral thermal shield around the reactor core.

16 Claims, 3 Drawing Figures

GAS-COOLED HIGH TEMPERATURE REACTOR WITH SUPPORTING STRUCTURE HAVING GAS CONDUITS THEREIN

BACKGROUND OF THE INVENTION

The invention relates to a gas-cooled high temperature reactor installed in the cavity of a prestressed cylindrical pressure vessel. More particularly, the invention is directed to gas-cooled high temperature reactors with supporting structure having gas conduits therein. Generally, a hot gas collector space is located underneath the supporting structure and a plurality of radial hot gas conduits connect with the hot gas collecting space, wherein the core structure of the high temperature reactor is surrounded by a lateral thermal shield and the supporting structure rests on a floor plate by means of columns arranged in the hot gas collecting space.

Supporting structures for a moderator block consisting of vertical moderator columns of a gas-cooled nuclear reactor are known. In these structures, a plurality of supporting plates are arranged in a plane adjacent to one another but with lateral clearance. Each supporting plate carries a limited number of the moderator plates. Such a supporting structure is described, for example, in West German Published Application 11 77 751. Each supporting plate rests on a solid support by means of three pillars, with the support in turn resting on the floor of the reactor vessel. The pillars, in the form of round columns, have a central part of steel, a sheathing and a thermal insulating layer between the central part and sheathing.

West German Published Application 11 22 641 shows a supporting structure for the moderator of a nuclear reactor wherein each of the vertical columns forming the moderator structure are carried by a rigid metal cylinder. The moderator columns and the metal cylinders support each other by way of a spherical support surface in the manner of a ball and socket joint. Each metal cylinder is equipped at its foot with a circular collar resting on a seat machined in a socket. The socket is part of the supporting structure, the lines for the cooling medium enter it from below.

It is known from West German Published Application 11 94 071 to support the moderator structure consisting of solid material of a nuclear reactor on a flat supporting suface. The surface is composed of several rigid supporting surface parts. Each part of the supporting surface is carried by a plurality of supporting posts provided individually with an articulated joint at their end in the vicinity of the end connected with the flat supporting surface. The lower ends of the supporting posts are rigidly secured in supporting stirrups, which in turn are resting on the floor of the reactor cavity.

Another supporting structure for the core of a gas-cooled nuclear reactor is described in West German Offenlegungsschrift No. 19 56 226. The core is supported on the floor of the reactor pressure vessel by means of a refractory material. In an upper layer of the refractory material voids are formed for the cooling gas. The voids are interconnected with each other and with the cooling gas conduits in the core structure. The voids also serve as the collector space with gas being conducted through a laterally connected hot gas conduit from the reactor.

The upper layer of the refractory material rests upon a lower layer formed by supporting columns resting on the floor of the pressure vessel, wherein each supporting column has a spherical seat, for example, of steel or cast iron.

The state of the art further includes a supporting floor for a pebble bed reactor (a reactor known as THTR 300 MWe), consisting of a plurality of hexagonal graphite blocks arranged into freely movable columns. Each of these colums is provided with a plurality of radial bores for receiving the cooling gas flowing from top to bottom through the pebble bed. Each of the columns is supported individually by a massive round column. All of the round columns are secured into the floor of the nuclear reactor, which consists of graphite plates. The hot cooling gas exiting from the supporting floor passes into the columnar hall formed by the round column. The hall serves as the hot gas collector space and is connected with several radial hot gas conduits. The radial hot gas conduits conduct the hot gas to the steam generators.

A further supporting structure, preferably for the core of a gas-cooled high temperature reactor with spherical fuel elements, is known from West German Offenlegungsschrift No. 27 18 493. Here again, the supporting structure consists of a plurality of graphite blocks arranged in layers above each other and provided with passages for the cooling gas. The bottom layer is formed by a plurality of support units composed of individual segments and each of the support units rests by means of a column head on a round column. The round columns pass through the hot gas collector space and are bonded into the floor of the nuclear reactor.

In West German Offenlegungsschrift No. 26 36 251 a floor for a large vessel exposed to high and varying temperatures and consisting of numerous elements of a material resistant to high temperatures is described. The elements, maintained together by an external support, are bearingly supported on roller bodies, the rolling planes of which are inclined downwards with respect to the support and/or a fixed point.

There is further known a yielding support for the heavy components of thermal power stations, such as for example, reactor pressure vessels or steam generators. The yielding support consists of a plurality of compressively stressed support rods. The yielding property of the support is accomplished by arranging several identical support rods adjacently to each other in the direction of the yielding. This support is described in West German Offenlegungsschrift No. 26 20 584.

All of the above-described structures constitute the background and starting point of the present invention. Gas-cooled reactors of the high temperature design for the nuclear reactors of this invention have floor plates upon which the supporting structure of the nuclear reactor is resting. These floor plates must satisfy requirements of very different natures. Firstly, the lifting of the core structure as the result of the sudden onset of high transient pressure in the hot gas collector space (due to a failure in the cooling gas circuit) must be prevented. This requires a solid connection of the floor plate with the bottom of the cavity, i.e. the bottom of the pressure vessel. Secondly, in the operating state of the high temperature reactor, thermal expansion occurs in the floor plate and the pressure vessel to a different degree as the result of different temperature exposures. Compensation for this is required to avoid the generation of thermal stresses between the two components.

SUMMARY OF THE INVENTION

It is, therefore, an object of the present invention to provide in a high temperature gas-cooled reactor, a floor plate for the support of the reactor core, whereby the core and its supporting structure are safely anchored so as to substantially eliminate any possibility of generating thermal stresses.

According to the invention, the floor plate comprises a disk-like center member and an annular outer member. The center member is preferably composed of individual segments. The annular outer member serves as the support for the lateral thermal shield and rests on the bottom of the pressure vessel cavity by means of columnar supports and preferably roller bearings arranged between the supports and the annular outer member. The disk-like center member is anchored by means of a plurality of supports in the bottom of the pressure vessel, the shape and arrangement of these supports being chosen so that they may be bendingly stressed in the radial direction, but that they remain rigid in the tangential direction. Since the pressure vessel is preferably cylindrical, the reactor core is also advantageously of cylindrical shape about the same central axis. Thus, the radial and tangential directions referred to are with respect to this cylindrical shape.

The annular outer member cannot lift off in the case of a disturbance because it is under the pressure of the relatively heavy lateral thermal shield. The difference in thermal expansion between the pressure vessel (which may be made of prestressed concrete or a cast material) and the annular outer member part will be equalized by the roller bearings.

In the case of the disk-like center member, differences in thermal expansion are compensated for by the yielding of the supports in the direction radial thereto and to the center of the reactor core. Forces acting in the direction tangential to the supports and to the reactor core, such as those potentially occurring for example during an earthquake, are absorbed so that the core structure is secured against torsional movement.

The core structure is also secure against displacement in case of a reactor failure or other disturbance due to the secure anchoring of the supports at their lower ends in the bottom of the pressure vessel. The upper ends of the supports are fastened, for example, by means of nut and bolt connections to the disk-like center member of the floor plate.

A failure raising the transient pressure in the hot gas collector space of a nuclear reactor occurs, for example when, in the case of a high temperature reactor with a helium turbine machine connected with the cooling gas circuit, a turbine blade fails. The high temperature reactor designed in keeping with the present invention is thus especially suitable for a nuclear power station having a so-called single circuit installation, i.e. a power plant, with a closed cooling gas circuit and a helium turbine generator coupled with the reactor.

Among the advantages of the high temperature reactor according to the present invention is the fact that both the floor plate and the conventional liner for the reactor cavity, are readily accessible for inspection and routine testing.

In a preferred embodiment the disk-like center member of the floor plate is centered by means of a rigid bolt. The bolt is secured in the bottom of the pressure vessel. A recess in the center of the disk-like member is provided for positioning on the rigid bolt. In the case of pebble bed reactors, the disk-like member is provided with several penetrations for the installation of conduits or tubes for the removal of the spherical fuel elements.

According to the invention, the supports may be in the form of rods, preferably with rectangular cross sections. The length of the cross section is preferably several times the width of the cross section.

In a particular advantageous embodiment, the support rods are arranged on pitch circles about the center axis of the pressure vessel. The longitudinal axis of each support rod with respect to the cross section always forms a right angle with a radian originating in the center axis of the pressure vessel in this preferred embodiment. This arrangement is particularly advantageous in that the rods are facing forces acting in the radial direction with their broad side and facing forces acting in the transversed direction with their narrow sides.

The individual segments of the disk-shaped center member are solidly joined with each other, so that a stable structure is formed. For example, the segments may be bolted and/or riveted together.

The support rods may be anchored in the bottom of the pressure vessel in a number of ways. In a preferred embodiment, the supports have a bifurcation at their lower end extending into the bottom of the pressure vessel. These bifurcated ends may be cast into the material of the bottom of the pressure vessel, e.g. cast into the concrete material itself. In an alternate preferred embodiment, the lower ends of the supports are designed in the shape of tubes which are cast into the bottom of the pressure vessel. The tubes may be bolted to the rod part proper, which would then extend a suitable distance.

BRIEF DESCRIPTION OF THE DRAWINGS

In the drawings, an example of the preferred embodiments of the high temperature reactor according to the present invention are schematically represented. Only a section of the supporting structure of the reactor with the floor plate is shown. The high temperature reactor shown in the drawings is cooled with helium and has spherical fuel elements; it is also part of a single circuit installation.

More particularly.

DETAILED DESCRIPTION OF PREFERRED EMBODIMENTS

Figure 1:
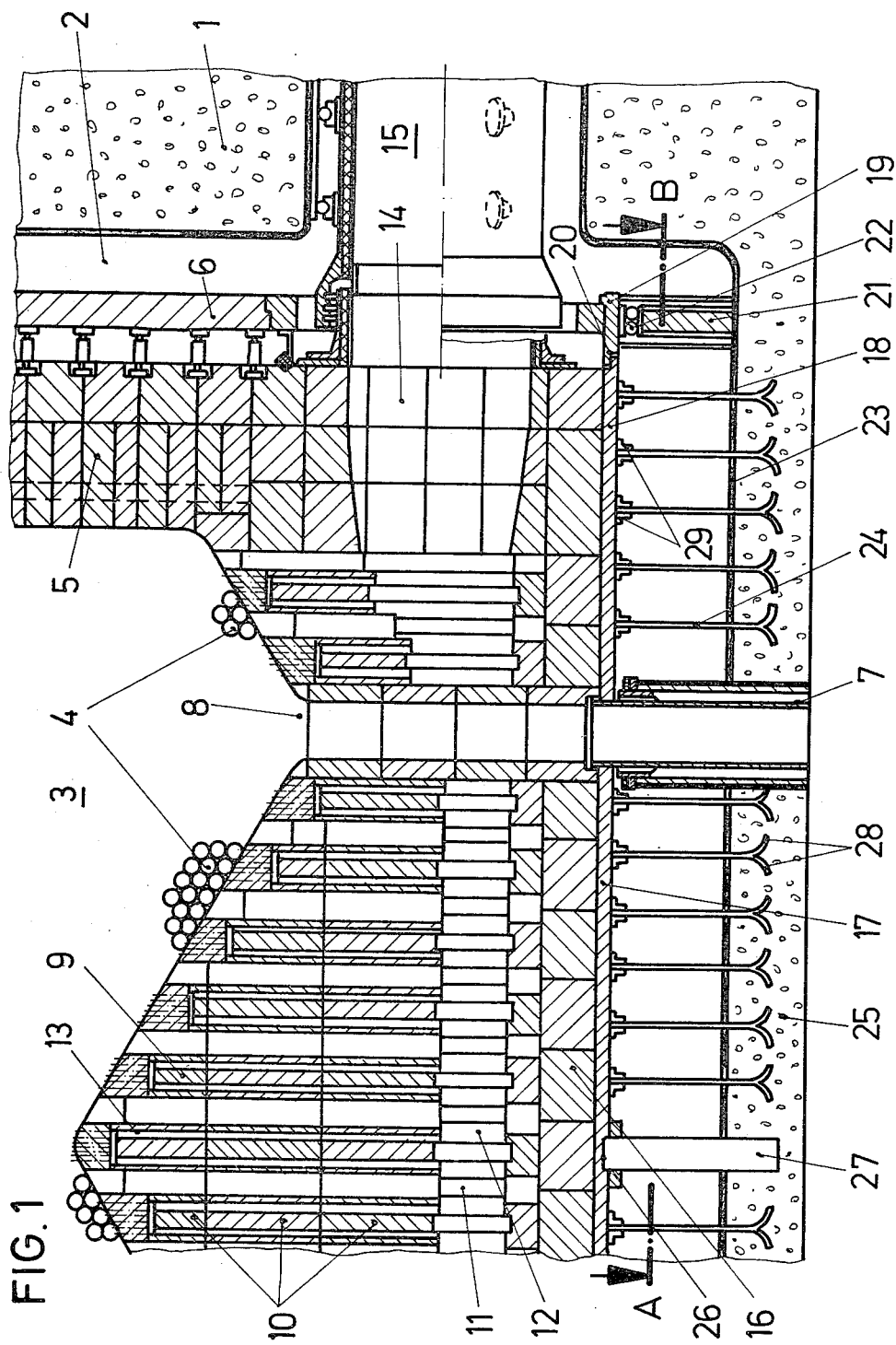
FIG. 1 shows a cross section of a portion of the supporting structure.

As seen from FIG. 1, the core 3 of a high temperature reactor is installed in the cavity 2 of a cylindrical pressure vessel of prestressed concete. The core contains a bed of spherical fuel elements 4. The bed and core area are surrounded by an annular lateral reflector 5 constructed of a plurality of graphite blocks, with an annular thermal side shield 6 being attached to the annular lateral reflector 5 on the outside. Several pebble removal tubes 7 are exiting from the bottom of the pebble bed. For each of the tubes 7, a conical pebble inlet 8 is provided.

The pebble bed rests on a supporting structure 9 consisting of an assembly of hexagonal graphite blocks arranged in stacks 10. The heights of the stacks 10 are set so that the above-mentioned conical pebble inlets 8 are formed. All of the stacks 10 rest on individual round columns 11. The round columns 11 together form a columnar hall, serving as the hot gas collector space 12. Bores 13 in the graphite blocks of the supporting structure 9 enable the cooling gas flowing through the pebble bed from top to bottom to enter the hot gas collector space 12.

Underneath the lateral reflector 5, the hot gas collector space 12 has several extensions 14, to each of which a radial hot gas conduit 15 is connected. The hot gas conduits 15 are connected by means of additional gas conduits with the inlet fittings of a helium turbine (not shown) installed within the pressure vessel 1. A failure in this area of the helium circuit (for example the stripping of a turbine blade) directly affects the pressure conditions prevailing in the hot gas collector space 12.

By means of the interposition of a layer of graphite blocks 16 limiting the flow of gas from the hot gas collector space 12 in the downward direction, the round columns 11 are resting on a floor plate 17 bolted together from individual segments (not shown). The segments may also be pin riveted together additionally. The segments form the disk-like center member 18 of the floor plate 17 which is surrounded by an annular outer member 19. Both parts are joined together positively by keying 20.

The annular outer member 19 is supported by means of the roller bearings 22 on columnar supports 21, which in turn are resting on the bottom 23 of the cavity 2. The lateral thermal shield 6 is resting on the annular outer member 19, the weight of the thermal shield making the lifting off of the annular outer member 19 impossible. The roller bearings 22 serve to equalize the differences in expansion.

Figure 2:
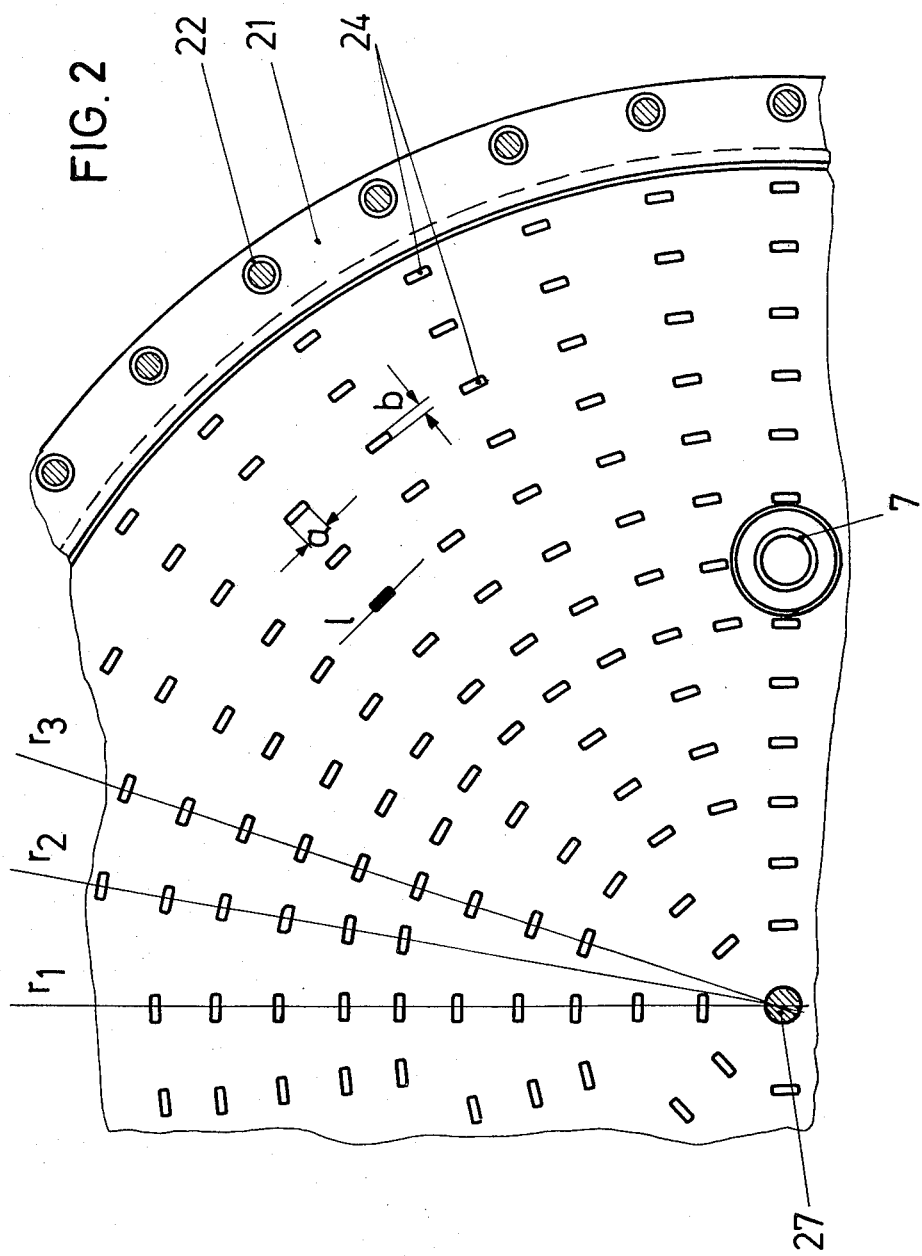
FIG. 2 depicts a section of the line A-B of FIG. 1.

The disk-like center member 18 of the floor plate 17 is supported by a plurality of supports 24 anchored in the bottom 25 of the pressure vessel 1. As support rods 24 with rectangular cross sections are used, as shown in FIG. 2, the length a of each rod (with respect to the cross section) amounts to a multiple of its width b.

The support rods 24 are arranged on a series of pitch circles around the axis of the pressure vessel 1, wherein support rods 24 located on the same pitch circle are facing each other with their narrow sides. For example, the support rods 24 are aligned so that their longitudinal axis 1 with respect to the cross section is forming always a right angle with a radius $r_1, r_2, r_3 \ldots$ originating in the axis of the pressure vessel. The shape and arrangement of the support rods 24 makes it possible for them to yield to forces acting upon them in the radial direction so that they may equalize different thermal expansions between the floor plate 17 and the pressure vessel 1. In the tangential direction the rods 24 possess great rigidity and thus they are able to absorb the transverse forces appearing under certain conditions (for example during earthquakes).

The disk-like center member 18 in its center has a recess 26, wherein the upper end of a rigid bolt 27 is seated. With its lower end, the bolt 27 is cast in the bottom 25 of the pressure vessel 1. It serves to center the floor plate 17.

In the embodiment shown in FIG. 1, the lower end of the rods 24 passes into a bifurcation 28 which is cast into the prestressed concrete of the pressure vessel 1. It provides for the solid anchoring of each rod 24. The upper ends of the rods 24 are fastened by means of the angle pieces 29 to the disk-like center member 18 of the floor plate 17.

Figure 3:
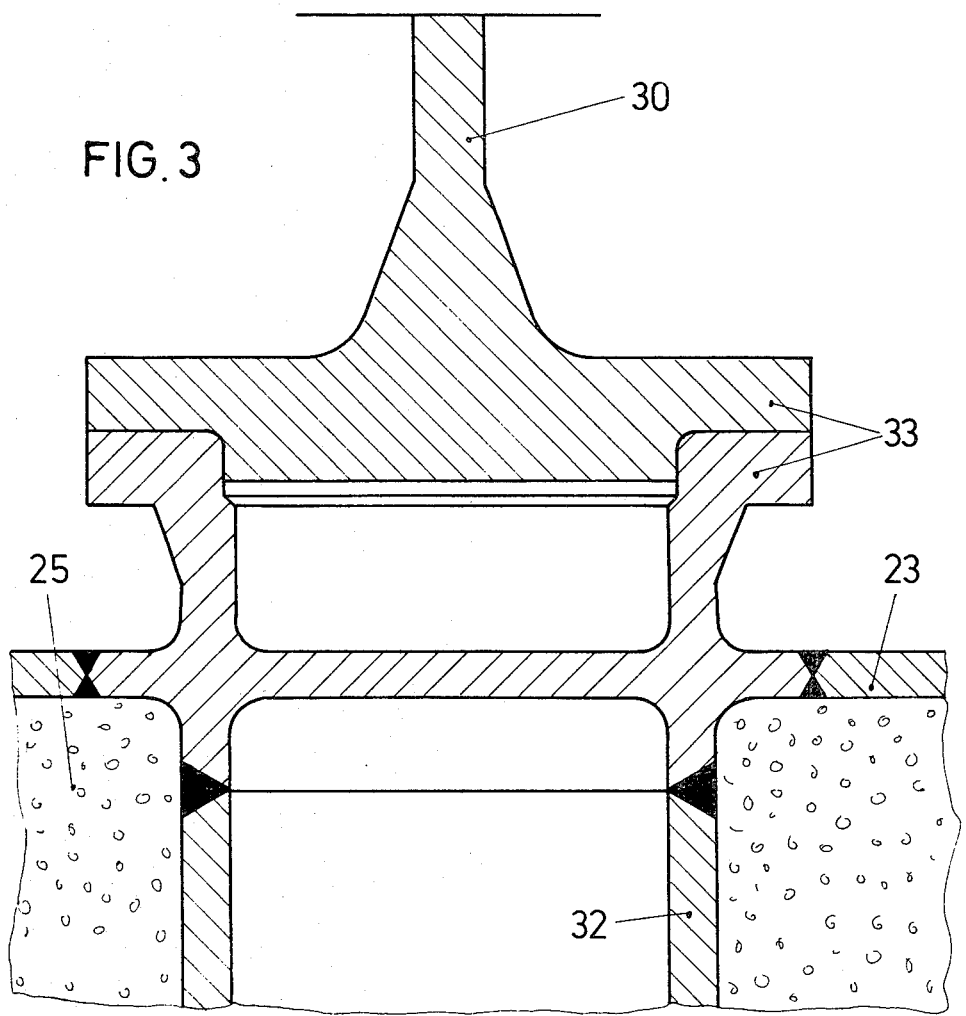
FIG. 3 shows an alternative to the support rods shown in FIG. 1, in an enlarged representation.

FIG. 3 displays an alternative to the support rods 24 shown in FIG. 1. In essence, these are also designed in the form of rods 30 having rectangular cross sections. The upper end of each rod 30 has an extension 31, solidly connected by means of bolting with the disk-like center member 18. The anchoring of the rods 30 in the bottom 25 of the pressure vessel 1 is accomplished in each case by means of a tube 32, which is cast into the prestressed concrete. The tubes 32 are joined with the center part of the rods 30 by means of a flange-like connecting member 33.

We claim:

1. A gas-cooled high temperature reactor arrangement inside a prestressed cylindrical pressure vessel comprising:
   a reactor core;
   a floor plate comprising a disk-like center member and an annular outer member;
   a core support structure resting on said disk-like center member and in supporting communication with said reactor core;
   a lateral thermal shield surrounding the sides of said reactor core and resting on said annular outer member;
   a plurality of elongated support members securely fastened at one end to said disk-like center member and at the other end to the prestressed pressure vessel;
   a plurality of columnar support members resting on the prestressed pressure vessel at their lower end and in supporting communication with said annular outer member at their upper end; and
   means for movably supporting said annular outer member on said plurality of columnar support member;
   wherein said elontated support members are capable of bending, in response to stresses in the direction radial to the central axis of the reactor core while remaining rigid in response to stresses in the direction tangential to the central axis of the reactor core.

2. The gas-cooled high temperature reactor of claim 1 further comprising a hot gas collecting space between said floor plate and said reactor core.

3. The gas-cooled high temperature reactor of claim 2 wherein said core support structure comprises a plurality of core support columns extending through said hot gas collecting space.

4. The gas-cooled high temperature reactor of claim 3 further comprising a plurality of gas conduits in open communication with said hot gas collecting space.

5. The gas-cooled high temperature reactor of claim 1 wherein said means comprise roller bearings attached to the top of each columnar support member.

6. The gas-cooled high temperature reactor of claims 1 or 5 wherein said elongated support members are in the form of rectangular shaped rods.

7. The gas-cooled high temperature reactor of claim 1 wherein each of said rods possess a rectangular cross section wherein the length of the cross section is a multiple of the width of the cross section and wherein the rods are arranged on pitch circles about the central axis of the pressure vessel whereby the longitudinal axis of each of said rods forms a right angle with a corresponding radian originating in the axis of the pressure vessel.

8. The gas-cooled high temperature reactor of claim 7 wherein said rods possess a bifurcation at their lower end extending into the prestressed pressure vessel.

9. The gas-cooled high temperature reactor of claim 1 wherein each of said elongated support members comprise an elongated central portion terminating at both ends in support portions extending in a plane perpendicular to the longitudinal axis of said center portion.

10. The gas-cooled high temperature reactor of claim 9 wherein the end of each elongated support members secured to the prestressed pressure vessel possesses a tubular shape.

11. The gas-cooled high temperature reactor of claim 10 wherein the prestressed pressure vessel is concrete and said elongated support members are secured at one end in the prestressed concrete pressure vessel.

12. The gas-cooled high temperature reactor of claim 8 further comprising a rigid support bolt securely fastened at its lower end to the prestressed pressure vessel and at its upper end to the center area of the disk-like center member, said support bolt longitudinally positioned along the central axis of the cylindrical pressure vessel.

13. The gas-cooled high temperature reactor of claim 12 wherein said disk-like center member is comprised of a plurality of segments.

14. The gas-cooled high temperature reactor of claim 13 wherein said segments are bolted and pin rivited together.

15. The gas-cooled high temperature reactor of claim 14 further comprising spherical fuel elements in said reactor core and means for removal of said fuel elements from said reactor core.

16. The gas-cooled high temperature reactor of claim 15 wherein said fuel element removal means comprises a plurality of tubular passageways extending from said reactor core through said disk-like center member and the prestressed pressure vessel.

* * * * *